Dec. 10, 1935.   P. D. HARVEY   2,023,584
MARINE REDUCTION AND REVERSE GEAR UNIT
Filed Jan. 5, 1931   2 Sheets-Sheet 2
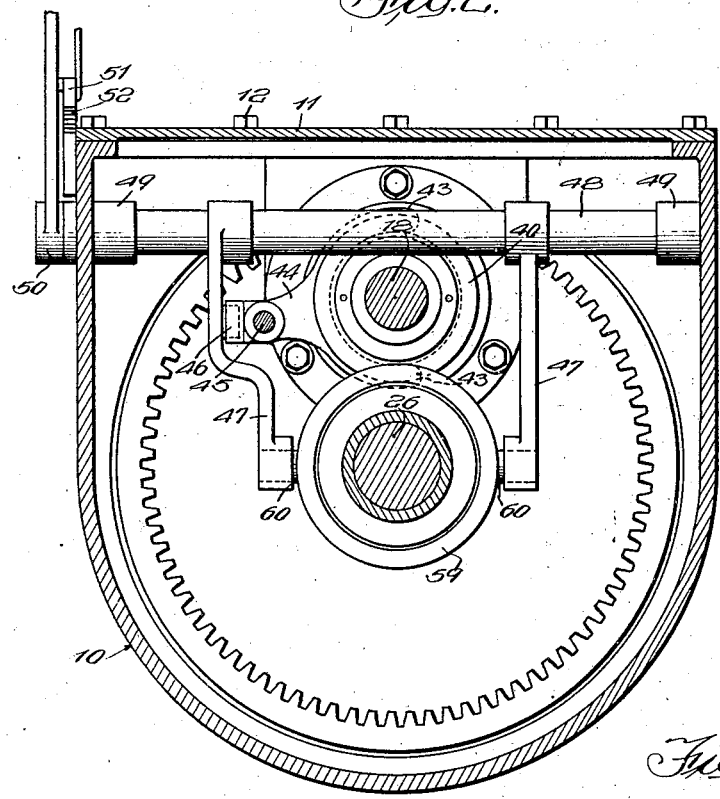
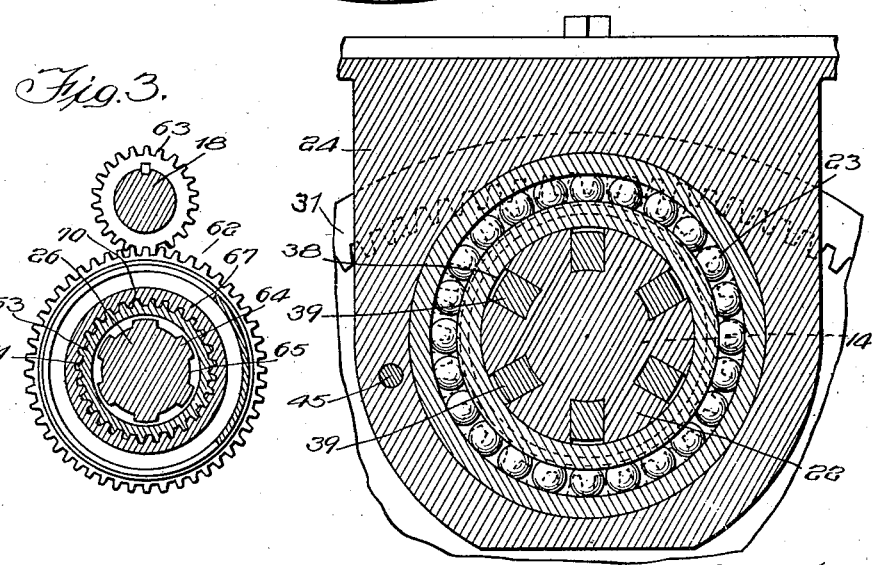

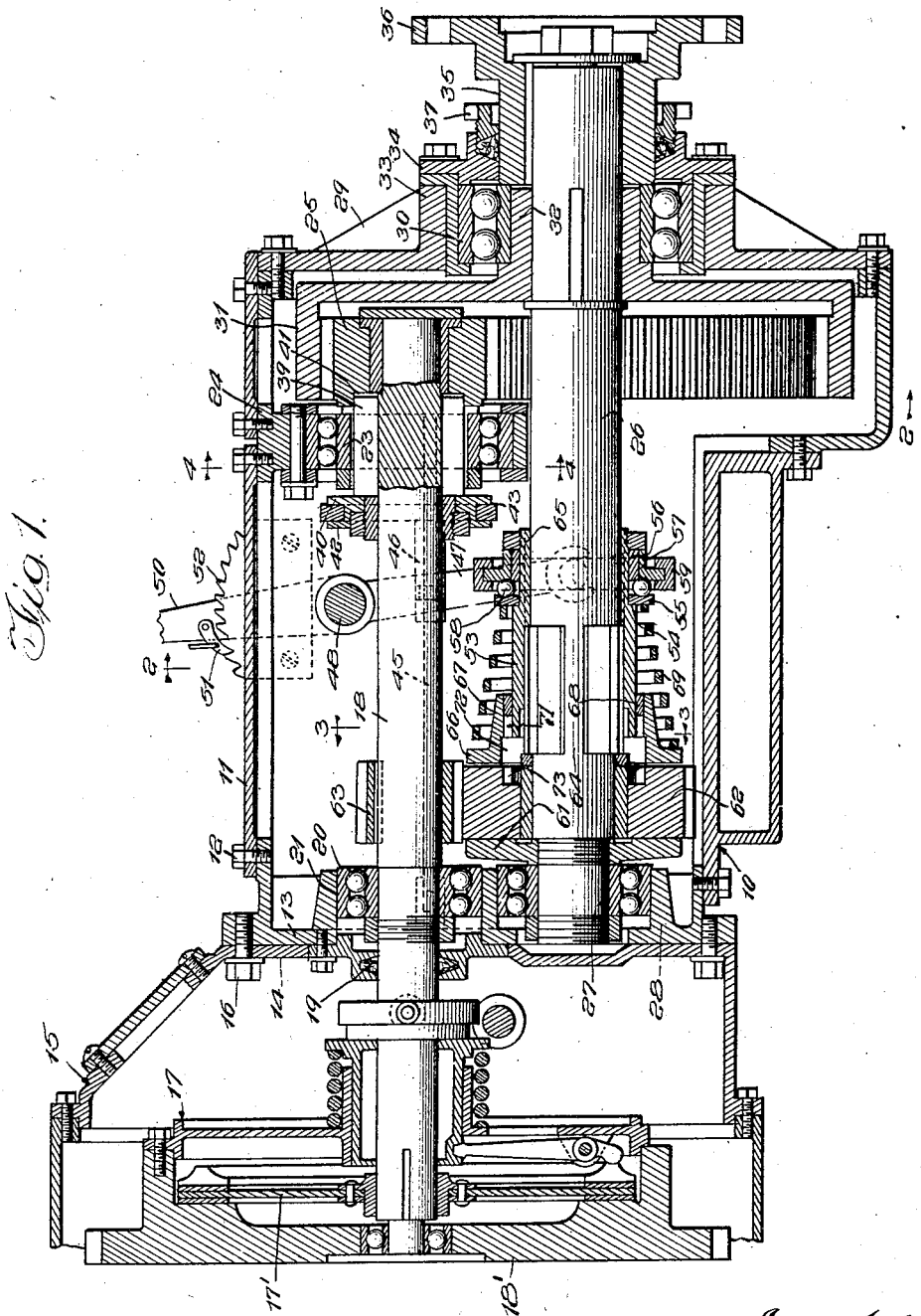

Patented Dec. 10, 1935

2,023,584

UNITED STATES PATENT OFFICE 2,023,584

MARINE REDUCTION AND REVERSE GEAR UNIT

Paul D. Harvey, Chicago, Ill.

Application January 5, 1931, Serial No. 506,774

9 Claims. (Cl. 74—377)

This invention relates to certain novel improvements in marine reduction and reverse gear units of the character particularly adapted for use in motor boats, motor launches and the like of a type propelled by internal combustion engines or similar motive power.

It has been the custom to provide low speed motive units in motor boats, motor launches and the like, for excessive propeller or screw speeds have been found to be detrimental. However, by reason of the development of the automotive art highly efficient high speed engines have been provided, and it is desirable that such engines be adapted for use in marine craft, especially by reason of their increased efficiency. It has, however, been necessary to provide means for reducing the speed of the motor in order that the screw will not be driven at an excessive rate of speed, and therefore one of the objects of my invention is to provide a novel speed reducing unit particularly adapted for use in marine craft.

It is often desirable to reverse the direction of rotation of the screw of a marine craft, as for example when it is desired to stop the craft quickly, and reversibility also greatly facilitates maneuvering of the craft. The screw which drives the craft is of course located in the water and therefore as long as the craft is in motion this screw will operate by reason of the action of the water thereon, and thus when a transmission is provided to bring about reversing of the direction of rotation of the screw the shaft connected to the screw, which extends to the transmission, will continue to rotate in the direction in which the screw has been rotating, and therefore when the driving means on this shaft is meshed with another driving means which is to serve to rotate the shaft in the opposite direction, a clash occurs. It is therefore another object of my invention to provide a reversing unit wherein the likelihood of clashing is eliminated.

An object of my invention, ancillary to the foregoing, is to provide a device of the above described character having a neutral position in order that the driving means may be entirely disconnected from the screw.

A further object of my invention is to provide a reverse mechanism and a speed reducing mechanism arranged in a single unit of economical manufacture and to provide a relatively simple device which may be compactly arranged.

A still further object of my invention is to provide a unit of the above described character wherein the various shafts are solidly journaled, and thus a structure is provided which will be highly resistant to wear and one wherein the life thereof is prolonged by reason of the capability of maintaining the parts in proper relation to each other.

A selected embodiment of my invention is illustrated in the accompanying drawings, and therein Fig. 1 is a longitudinal vertical sectional view of a marine reduction and reverse gear unit embodying my invention;

Fig. 2 is a transverse sectional view taken substantially on the line 2—2 on Fig. 1;

Fig. 3 is a fragmentary transverse sectional view taken substantially on the line 3—3 on Fig. 1; and Fig. 4 is a fragmentary transverse sectional view taken substantially on the line 4—4 on Fig. 1.

Referring to the drawings, 10 indicates the housing of my improved unit having an opening in the upper side thereof closed by a removable plate 11 held in position by suitable securing devices, such as bolts 12. The plate 11 may be removed to afford access to the interior of the housing 10. To what may be termed the front wall 13 of the housing 10, the wall 14 of a clutch housing 15 is secured by suitable devices such as bolts 16. In the clutch housing 15 a clutch structure, generally indicated by 17, is arranged, and in the present instance I have shown a so-called single plate friction clutch, embodying the plate 17' splined on the drive shaft 18 of the transmission and engageable with the flywheel 18' of a suitable engine. However, my invention is not limited to the use of a single plate clutch as any other type of clutch may be used if so desired. The drive shaft 18 extends from the clutch structure 17 through an opening in the wall 14 and a packing gland 19 is provided to prevent leakage thereby. The shaft 18 extends through and is journaled in an anti-friction bearing 20 suitably mounted in the flanged opening 21 provided in the wall 14, said bearing 20 being arranged in the housing 10. The shaft 18 includes a splined section 22 journaled in the anti-friction bearing 23 carried by the bracket 24, supported from the upper side of the housing 10. The portion of the shaft 18 extended beyond the splined portion 22 has a spur gear 25 rotatably mounted thereon. A driven shaft 26 is journaled in an anti-friction bearing 27 mounted in a recess 28 provided in the wall 14. An internal gear 31 includes a hub 32 journaled in the anti-friction bearing 30 carried by the rear wall 29 of the housing. The driven shaft 26 is fixed in the hub 32 and is therefore carried by the anti-friction bearing 30. The spur gear 25 meshes with the internal gear 31 at all times for a purpose to be brought forth hereinafter. The bearing 30 is mounted in a neck 33 on the wall 29 and in this neck there is a bearing retainer 34 in which the hub 35 of the driving flange coupling 36 is journaled. The bearing retainer 34 carries a packing gland nut 37 which cooperates with the hub 35 that is keyed to the shaft 26 in an approved manner. If the gear 25 is connected to the shaft 18 the internal gear 31 is rotated in the same direction as said shaft and therefore through the devices described, the flange coupling 36 is similarly rotated. Keyways 38 are defined by the splined portion 22 which are uniformly spaced apart. Extended through these keyways are a plurality of keys 39 fixed to a collar 40. In the face of the gear 25, disposed toward the bearing 23, a plurality of recesses or pockets 41 are provided. The keys 39 are movable through the keyways 38, and when the ends of these keys are passed beyond the keyways they seat in the pockets 41 and by reason of the snug fit of the keys in the keyways and in the pockets 41 the gear 25 is positively connected to the shaft 18 by these devices. The collar 40 is slidably mounted on the shaft 18 and has a peripheral groove 42 therein in which fingers 43 of the fork 44 are disposed. The fork is mounted on the rod 45 carried by the bracket 24 and the flange above the opening 21. The fork is connected, as at 46, to one of the operating arms 47, 47 fixed on the transverse shaft 48 journaled in bearings 49, 49 (Fig. 2) provided on opposite sides of the housing 10, and one end of this shaft 48 extends through one of the bearings 49 and out of the housing 10, and fixed on this end of the shaft is an operative lever 50 having a retaining pawl 51 thereon adapted to cooperate with the ratchet segment 52 carried by the housing 10. By manipulating the lever handle 50 after the pawl 51 has been retracted from one of the teeth of the segment 52 the shaft 48 is rotated to move the arms 47, and this movement is transmitted to the collar 40 and thus the collar is moved to insert or withdraw the ends of the keys 39 from the pockets 41, and therefore the handle 50 controls the connection of the gear 25 to the shaft 18 and thereby regulates the operation of the internal gear 31, the operation of the internal gear 31 as brought about by the motivation of the gear 25 being in the forward direction. Furthermore, by reason of the ratio between the gear 25 and the gear 31, it is manifest that a speed reduction is provided, and therefore the gear 31 and consequently the flange coupling 36 is rotated much slower than the shaft 18. The flange coupling 36 is fixed to the shaft 26 and also to the screw of the craft with which the device is associated. It has been pointed out that if the craft with which the screw is associated is moving, rotary movement is imparted to the screw whether or not power is being supplied to the screw, and it is therefore manifest that when the keys 39 are retracted from the pockets 41 that the shaft 26 continues to rotate. When however it is desired to reverse the direction of the rotation of the shaft 26 in order to operate the screw in a direction opposite to that in which it is driven through the action of the gear 25, it is necessary that some means be provided whereby the opposite rotation of the member to be connected to the means which will bring about this opposite rotation of the shaft 26 be retarded or interrupted. The means which accomplish this include the sleeve 53 slidably mounted on the splined section of shaft 26 having a shoulder 54 thereon against which the ball thrust ring 55 is abutted. Slidable on the sleeve 53 is a bushing, carrying ball thrust plate 57 and a plurality of balls 58 are disposed between the two ball thrust plates. Surrounding the marginal portions adjacent the periphery of the flanged thrust ring 57 is a yoke 59 having pins 60, 60 (Fig. 2) thereon journaled in bearings at the lower ends of the arms 47, 47 and by this arrangement the sleeve 53 is connected to the operating means which move the keys 39 in and out of the pockets 41. The connection of these parts is such that when the keys 39 are being moved into the pockets 41 the sleeve 53 is moved from engaging position, and when the keys 39 are withdrawn from the pockets 41 movement is imparted to the sleeve 53 to move said sleeve toward engaging position. Rotatably mounted on the shaft 26 is a spur gear 62 meshed with a pinion 63 fixed on the shaft 18, and preferably the ratio between the pinion 63 and the gear 62 is similar to the ratio between the gears 25 and 31 in order that a similar speed reduction will be provided. By reason of the fact that the gear 62 is freely rotatable relative to the shaft 26 and in view of the rotation of this gear opposite to the direction of rotation of the gear 25, it is manifest that if the shaft 26 is connected to the gear 62 it is rotated in a direction opposite to the direction in which it is rotated by the action of the gear 25, and the sleeve 53 is employed to bring about the connection of the shaft 26 to the gear 62. To this end, a portion of the shaft 26 is provided with splines 64 (Figs. 1 and 3), and cooperating splines 65 are provided in the sleeve 53. A friction plate 66 bears against the gear 62 and includes a neck portion 67 in which there is a bushing 68 slidably mounted on the periphery of sleeve 53. A spring 69 is extended between the thrust ring 55 and the plate 66, and when the sleeve 53 is moved, as above stated, this spring is compressed and therefore the plate 66 is forced into braking engagement with the gear 62. A friction disc 61 is fixed to shaft 26 and is disposed in engagement with the gear opposite said plate to assist in the braking action. Internal clutch teeth 70 are provided in the bore of neck portion 67, which are interlocked with external clutch teeth 71 at the forward end of sleeve 53 to provide a means to drive friction plate 66 during braking engagement with the gear 62. During the above described operation the gear 62 rotates in a direction opposite to the direction of rotation of the shaft 26. When it is desired to reverse the device, the clutch plate 17' is disengaged from the flywheel 18' and the gear 25 is disconnected and thus the shaft 18 is free and there is no tendency to drive the gear 62 from the pinion 63. However the movement caused by the lever 50 compresses the spring 69 and therefore the rotation of the gear 62 is retarded and eventually stopped. As soon as rotation with the gear 62 ceases it is picked up by the shaft 26 and turned therewith and this movement is transmitted to the pinion 63 and shaft 18 to rotate the clutch disc 17' in a direction opposite to that in which it has been rotating. Thus as the sleeve 53 continues to move forwardly the teeth 71 will disengage the teeth 70 and move across the clearance space 72 into engagement with the clutch teeth 73. Since the teeth 71 first move into the clearance space, wherein they are entirely disengaged from either the teeth 70 or the teeth 73, there may be a slight relative movement and thus the teeth 71 may be readily engaged with the teeth 73. The teeth 71 and 73 are formed in the nature of gear teeth but are in reality jaw clutch members. Since the gear 62 is rotating in the same direction as the shaft 26 it is manifest that the interconnection of the gear and shaft is brought about without clashing. Thus as soon as the plate 17' is re-engaged with the flywheel 18' the direction of rotation of the shaft 26 is reversed. It is manifest that the flywheel 18' always rotates in the same direction and under this last described condition the plate 17' is rotated oppositely thereto and thus when the plate and flywheel are engaged there is a slight but not objectionable thrust imparted. When the handle 50 is manipulated to move the sleeve 53 in a direction opposite to that described, said sleeve is disconnected from the gear 62, thereby freeing the shaft 26, and the parts are disposed in a neutral position, that is, neither the sleeve 53 nor the keys 39 will be engaged with driving members although if movement of the lever 50 is continued in the last-named direction the keys 39 engage in the pockets 41 to again operate the screw in a forward direction.

It is to be understood that a lubricant is stored in the housing in order that the gears will be properly lubricated. Moreover, I have shown in each embodiment a drive plate and I have stated that this drive plate is intended to be connected to the usual marine screw or propeller. I have not shown this screw nor the manner in which the drive plate may be connected thereto, for it is to be understood that any approved mechanism may be provided and it is intended that the drive plate shall be connected to such mechanisms in the usual manner. Moreover, the device is not limited to marine usage but may be used advantageously in automotive vehicles and the like.

In the foregoing description I have set forth a selected embodiment of my invention and I have provided an arrangement whereby the direction of rotation of a screw of a marine craft is readily reversed. Moreover, I have provided an arrangement whereby this reversing is brought about without any clashing of the parts to be interconnected to bring about such reverse operation at the same speed as the forward driving movement. In addition I have provided an arrangement whereby a speed reduction is associated with the reversing mechanism, and I am therefore enabled to use a so-called high speed engine to operate the screw of a marine craft by reason of the fact that I am enabled to reduce the drive shaft speed of such an engine in an amount sufficient to permit efficient operation of a screw.

In the foregoing description I have set forth a selected embodiment of my invention, but it is to be understood that this is not to be taken as the only form in which my invention may be constructed, for it is capable of variation and modification and I therefore do not wish to be limited to the precise details set forth but desire to avail myself of such changes and modifications as fall within the purview of the following claims.

I claim:

1. In a marine reverse and reduction gear unit, a drive shaft, bearings for said drive shaft, a gear rotatably mounted on the drive shaft adjacent one of the bearings therefor, a driven shaft, bearings for the driven shaft, an internal gear fast on the driven shaft and meshed with the gear on the drive shaft, the drive shaft including a part in the bearing adjacent the gear thereon, said part having openings therein, means movable through said openings for connecting the gear on the drive shaft to the drive shaft to rotate the driven shaft in one direction, means for reversing the direction of rotation of the driven shaft subsequent to disconnection of the gear on the drive shaft from the drive shaft and including interengageable parts, and means for preventing a clash of said interengageable parts when said reversing means is operated immediately after a disconnection of the gear on the drive shaft from the drive shaft.

2. In a marine reverse and reduction gear unit, a drive shaft, bearings for said drive shaft, a gear rotatably mounted on said drive shaft outwardly of one of said bearings and having pockets therein, the drive shaft including a part in the bearing adjacent the gear thereon, said part having openings therein, a collar slidable on said drive shaft and including portions movable through said openings and engageable in the pockets in said gear to connect the gear to the drive shaft, a driven shaft, an internal gear fast on the driven shaft and meshed with the gear on the drive shaft to be driven in one direction when the gear on the drive shaft is connected to the drive shaft, means for reversing the direction of rotation of the driven shaft subsequent to the disconnection of the gear on the drive shaft from the drive shaft and including interengageable parts, and means for preventing a clash of said interengageable parts when said reversing means is operated immediately after disconnection of the gear on the drive shaft from the drive shaft.

3. In a marine and reduction gear unit, a drive shaft, a driven shaft, means for interconnecting said shafts to rotate said driven shaft in one direction, means including a gear rotatably mounted on the driven shaft and a pinion fixed on the drive shaft and constantly meshed with the gear for rotating the driven shaft in the other direction, a sleeve slidable on and keyed to the driven shaft and having abutment means thereon, brake means on said sleeve and engageable with the side of said gear, yieldable means disposed about said sleeve between said abutment means and said brake means, said sleeve and said gear including interengageable parts whereby said sleeve may be connected to said gear, and means for moving said sleeve along said shaft and toward said gear to compress said yieldable means to urge said brake means into engagement with said gear and to subsequently interconnect said interengageable means to thereby interconnect said gear and sleeve while said yieldable means forcibly holds said brake means against said gear.

4. In a marine and reduction gear unit, a drive shaft, a driven shaft, means for interconnecting said shafts to rotate said driven shaft in one direction, means including a gear rotatably mounted on the driven shaft and a pinion fixed on the drive shaft and constantly meshed with the gear for rotating the driven shaft in the other direction, a sleeve slidable on and keyed to the driven shaft and having rotatable abutment means thereon, a brake disc slidably mounted on the sleeve and engageable with the side of said gear, a spring disposed about said sleeve between said abutment means and disc, said gear having a plurality of teeth in the side thereof, said sleeve having a plurality of teeth at the end thereof engageable with the teeth in said gear, and means for moving said sleeve along said shaft and toward said gear to compress said spring to urge said brake disc into engagement with said gear to frictionally connect said gear and sleeve and to subsequently interengage the teeth on said gear and sleeve to positively connect said gear and sleeve while said spring forcibly holds said brake disc in engagement with said gear.

5. A reverse gear unit comprising a casing, a drive shaft in said casing, a driven shaft in said casing, an internal gear in said casing fast on one of said shafts, a gear in said casing on the other of said shafts and meshed with said internal gear, a clutch for connecting said gear to said other shaft, a spur gear in said casing mounted on said one shaft, another clutch for connecting said spur gear to said one shaft, another spur gear meshed with the first spur gear and fast on said other shaft, manually operable shifting means including a part extending exteriorly of said casing, and means connecting said shifting means to said clutches whereby said part may be moved to disengage one clutch and engage the other clutch so that movement may be transmitted from said drive shaft to said driven shaft through one or the other of the sets of meshed gears.

6. In a marine reverse and reduction gear unit, a casing, a drive shaft rotatably mounted in said casing and having an enlarged portion thereon adjacent one end thereof, said enlarged portion having keyways extending therethrough, a driven shaft rotatably mounted in said casing in parallel relation with said drive shaft, an internal gear fast on said driven shaft, a gear rotatably mounted on said drive shaft intermediate said enlarged portion and the adjacent end of said shaft and meshed with said internal gear, a shift collar slidably and non-rotatably mounted on said drive shaft and having keys thereon extending through the keyways in said enlarged portion, said gear having clutch elements in the side thereof disposed toward said enlarged portion and in which said keys are engageable to connect the gear on the drive shaft to said drive shaft, a pinion fast on said drive shaft, a gear rotatably mounted on said driven shaft and meshed with said pinion, a shift collar slidably and non-rotatably mounted on said driven shaft and having means thereon for connecting the gear rotatable on said driven shaft to said driven shaft, and means for sliding said shift collar along the shafts on which they are mounted to selectively connect the rotatably mounted gears to the shafts on which they are mounted whereby said driven shaft is rotated in one direction when the gear rotatable on the drive shaft is connected to the drive shaft and in the other direction when the gear rotatable on the driven shaft is connected to the driven shaft.

7. In a gear unit, a casing, a drive shaft rotatably mounted in said casing, a driven shaft rotatably mounted in said casing in parallel relation with said drive shaft, an internal gear fast on said driven shaft, a mounting for said drive shaft and including a bearing positioned inwardly of one end of the drive shaft, a gear rotatably mounted on said drive shaft intermediate said bearing and said end of said shaft and meshed with said internal gear, said drive shaft including a part in said bearing having openings therein extending parallel with the axis of said drive shaft, said gear having clutch elements on the side thereof adacent said bearing, means slidably and non-rotatably mounted on the drive shaft and including portions movable through said openings and engageable with said clutch elements to connect the gear to the drive shaft to thereby transmit movement from the drive shaft to said internal gear and said driven shaft, a pinion fast on said drive shaft, a gear rotatably mounted on said driven shaft and meshed with said pinion, means for connecting said last named gear to said driven shaft whereby rotation is imparted to said driven shaft in a direction opposite to that imparted to said driven shaft when said internal gear is driven, and means for moving said portions through said openings and for operating the means connecting the gear rotatably mounted on the driven shaft to the driven shaft and operable to selectively connect the gear rotatable on the driven shaft to said driven shaft or the gear rotatable on the drive shaft to the drive shaft.

8. In a gear unit, a casing, a drive shaft rotatably mounted in said casing, a driven shaft rotatably mounted in said casing in parallel relation with said drive shaft, an internal gear fast on said driven shaft, a mounting for said drive shaft and including a bearing positioned inwardly of one end of the drive shaft, a gear rotatably mounted on said drive shaft intermediate said bearing and said end of said shaft and meshed with said internal gear, said drive shaft including a part in said bearing having openings therein extending parallel with the axis of said drive shaft, said gear having clutch elements on the side thereof adjacent said bearing, means slidably and non-rotatably mounted on the drive shaft and including portions movable through said openings and engageable with said clutch elements to connect the gear to the drive shaft to thereby transmit movement from the drive shaft to said internal gear and said driven shaft, a pinion fast on said drive shaft, a gear rotatably mounted on said driven shaft and meshed with said pinion, means slidably and non-rotatably mounted on said driven shaft for connecting the gear rotatably mounted thereon to said driven shaft whereby when said gear is connected to said driven shaft said driven shaft is rotated in a direction opposite to that in which it is rotated when said internal gear is driven, and means for selectively operating the means slidably and non-rotatably mounted on said drive and driven shafts whereby only one or the other of said means connects the gear on its shaft to the shaft.

9. In a marine reverse and reduction gear unit, a casing, a drive shaft rotatably mounted in the casing, a driven shaft rotatably mounted in the casing, an internal gear fast on the driven shaft, a gear rotatably mounted on the drive shaft and meshed with the internal gear, a pinion fast on the drive shaft in spaced relation with the gear thereon, a gear rotatably mounted on the driven shaft and meshed with said pinion, and means for selectively connecting the gears rotatably mounted on said shafts to said shafts whereby the driven shaft is driven in one direction when the gear rotatable on the drive shaft is connected to the drive shaft and in the other direction when the gear rotatable on the driven shaft is connected to said driven shaft.

PAUL D. HARVEY.